United States Patent [19]

Kuzmin et al.

[11] 4,370,800

[45] Feb. 1, 1983

[54] METHOD OF BALANCING ELECTRICAL MACHINE ROTOR

[76] Inventors: Viktor V. Kuzmin, prospekt Gagarina, 92, kv. 43; Vadim B. Kaplunov, ulitsa Bairona, 138 B, kv. 45; Boris I. Ljuty, ulitsa Mira, 62, kv. 26, all of, Kharkov, U.S.S.R.

[21] Appl. No.: 201,905

[22] Filed: Oct. 29, 1980

[30] Foreign Application Priority Data

Nov. 1, 1979 [SU] U.S.S.R. .............................. 2829302

[51] Int. Cl.³ ...................... H02K 15/02; H02K 15/16
[52] U.S. Cl. ........................................ 29/598; 310/53; 310/59; 310/61
[58] Field of Search ...................... 29/598; 310/53, 59, 310/61

[56] References Cited

U.S. PATENT DOCUMENTS 3,163,789 12/1964 Rosenberg .............................. 310/53
3,622,820 11/1971 Tjernstrom ........................ 29/598 X

FOREIGN PATENT DOCUMENTS 54-36510 3/1979 Japan ..................................... 29/598

*Primary Examiner*—Albert W. Davis, Jr.
*Attorney, Agent, or Firm*—Fleit & Jacobson

[57] ABSTRACT

Method of balancing an electrical machine rotor comprising starting the liquid cooling system of the rotor winding formed of parallel hydraulic branches arranged on the body of the rotor, monitoring the variables of the cooling conditions of said branches, with the liquid cooling system under operation, for determining temperature asymmetry which leads to heat unbalance of the rotor, and altering hydraulic resistance in said branches so that the proportion of said variables provide the same magnitude of overheating of the liquid at least in each pair of the diametrically arranged branches of the cooling system.

4 Claims, 12 Drawing Figures

METHOD OF BALANCING ELECTRICAL MACHINE ROTOR

BACKGROUND OF THE INVENTION

1. Field of the Invention

This invention relates to the field of electrical engineering, and particularly to a method of balancing a rotor of an electrical machine and may be utilized for balancing a rotor with a liquid cooling system of the rotor winding of a high-power turbine generator.

2. Description of the Prior Art

The liquid cooling system of the rotor winding of such electrical machines is characterized by symmetrical distribution, on the rotor body, of several dozens of parallel hydraulic branches of the hydraulic duct of the liquid cooling system which is necessary for providing the heat balance of the rotor.

However, it is very difficult to agree all the parallel hydraulic branches in a strictly symmetrical relation. In addition, the hydraulic resistance of each of said branches is different because of the difference in internal dimensions of said branches, coupling sleeves, water delivery pipes etc., and also because of the difference in the degree of liquid flow turbulence therein.

The above facts lead to asymmetry in the distribution of the heat field across the active section of the rotor, to a temperature bend of the rotor and the heat unbalance thereof which in turn result in an increase in the allowable level of the rotor bearing vibration.

Moreover, the heat unbalance may be caused also by a redistribution of the liquid flow rate in the hydraulic branches of the hydraulic duct of the cooling system during the rotor operation when changes in operating conditions of an electrical machine take place. The level of rotor vibration must be constantly controlled and the vibrating condition of the rotor is to be adjusted to the accepted standard by balancing the rotor by means of various methods.

Prior art methods of balancing electrical machine rotors by elimination of the heat unbalance are labor-consuming, technologically inefficient, and do not provide for reliable rotor operation under all operating conditions.

Known in the art is a method of compensating the heat unbalance by mounting balancing loads (M. M. Isakovich, Z. I. Kleiman, B. H-Perchanock "Ustranenie vibratsii elektricheskih mashin". Energia Publishers, Moscow), 1969, p. 182). This method allows elimination of rotor unbalance and decreasing its vibration level to the predetermined standard only under certain operating conditions, for example under a rated load.

An inadmissible increase in rotor bearing vibration is observed when the operating conditions change to a reduced load or idling, and also when cooling system variables are changed.

Also known in the art is a method of compensating the heat unbalance by changing hydraulic resistances in the branches of the hydraulic duct of the rotor winding cooling system (M. M. Isakovich, Z. I. Kleiman, B. H-Perchanock "Ustranenie vibratsii elektricheskih mashin", Energia Publishers, Moscow, 1969, p. 182-183).

This method consists in preliminarily controlling the magnitude of bearing vibration and defining regions of the hydraulic duct of the cooling system, which cause a temperature bend of the rotor, and then providing such a temperature asymmetry across the cross section of the rotor which eliminates the temperature bend and the resulting increased vibration. This is attained by changing the hydraulic resistance in the branches of the hydraulic duct of the winding cooling system which are opposite to those branches which caused the temperature bend, for example by partially closing ventilation passages.

The precision of choice of said regions and the magnitude of the temperature asymmetry is monitored by variables of the bearing vibration under stable conditions of idling and load of the machine.

This method allows determining the branches of hydraulic duct of the cooling system for changing their hydraulic resistance only by way of tests requiring many times repeated labor-consuming operations of assembly and disassembly of the electrical machine.

After elimination of the temperature bend and obtaining an admissible level of vibration, with this method, the temperature field across the cross section of the rotor still remains nonuniform, and the machine so balanced can not reliably operate under all admissible conditions, since with a change of operating conditions the temperature field of the rotor changes and a temperature unbalance appears.

A principle object of the invention is to provide a more simple and reliable method of balancing a rotor of an electrical machine with a liquid cooling system of the rotor winding, which permits highly accurate detection and elimination of a heat unbalance of the rotor at rest.

Another object of the invention is to provide a method of balancing a rotor which provides the stability of admissible vibration characteristics under various operating conditions of an electrical machines.

Still another object of the invention is to provide a method whcih permits comparative analysis of variables of the rotor cooling conditions during the operation of an electrical machine.

SUMMARY OF THE INVENTION

These and other objects of the invention are attained by that in a method of balancing a rotor of an electrical machine with a liquid cooling system of its winding, in the form of parallel hydraulic branches on the rotor body, by changing the hydraulic resistance in the parallel hydraulic branches till elimination of temperature asymmetry in the rotor resulted in its heat unbalance, according to the invention, first the variables of cooling conditions of said branches are monitored with the liquid cooling system under operation, and then the hydraulic resistance in the branches is changed so that the proportion of said variable would provide the same value of liquid overheating at least for each pair of the diametrically arranged branches of the cooling system.

The claimed method permits detection and elimination of heat unbalance of the rotor at rest. It is attained by detection of the rotor heat unbalance from the proportion of the cooling conditions variables in parallel branches of the operating liquid cooling system positioned on the rotor body, for instance, from liquid consumption or flow rate in the diametrically arranged branches of the cooling system.

In addition, this method provides stability of the admissible vibration characteristics under various operating conditions of the rotor operation because, for example, with an increase in the exciting current of the rotor liquid overheating increases in the equal measure at least in each pair of the diametrically arranged branches. In the result, the achieved temperature symmetry of the rotor is not broken.

The elimination of the heat unbalance of the rotor according to the data of monitoring the cooling conditions variables of said branches of the rotor at rest excludes the labor-consuming steps of disassembling and assembling the electrical machine, and its starting in order to check the vibration as it takes place in the known methods of balancing a rotor.

Balancing a rotor by the described method is preferably carried out at the nominal liquid flow rate through the rotor winding.

According to the preferred embodiment of the invention, the hydraulic resistance in said branches is changed so that the proportions of said variables provide the same value of liquid overheating in all said branches of the cooling system.

This allows not only the symmetry of the rotor temperature field to be achieved but its maximum uniformity to be obtained.

According to the invention, it is substantially necessary to monitor the variables of said branches by introducing some marks in the flow of liquid at the rotor inlet, and monitoring their passing through the insulation elements of said branches.

This excludes the necessity of mounting sensitive elements directly on said branches for determination of the variables of their cooling, since, in this case, monitoring the variables may be carried out, for example, according to the leakage current through the insulation elements of said branches.

Furthermore, this method permits determination of the variables of said branches both when a rotor is at rest and when it rotates since the introduction of a mark and determination of the leakage current through the insulation elements are carried out outside the body of the rotor and at any time of the electrical machine operation.

More accurately monitoring the variables may be carried out with identification of the marks by means of readings on sensitive elements mounted at the outlet of said branches downstream the insulation elements.

This permits, simultaneously with obtaining a general chart of indexes of cooling conditions, obtaining a chart for each branch and carrying out a comparative analysis for identification of the mark of each branch in the general chart thus facilitating diagnostics of the variables of the cooling conditions during the rotor operation.

BRIEF DESCRIPTION OF THE DRAWINGS

The method will now be described in detail with reference to the accompanying charts and diagrams wherein.

DESCRIPTION OF THE PREFERRED EMBODIMENTS

The method of balancing a rotor is carried out as follows.

A rotor 1 is balanced on a 500 MW, power turbine generator with a water cooling system of a winding 2 of the rotor (FIG. 1) which is formed of square copper conductors having internal passages for passing water.

Figure 2:
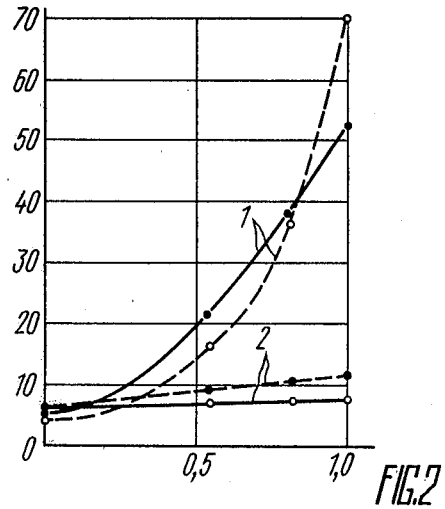
FIG. 2 shows measuring the rotor vibration prior and after the balancing by said method of the invention.

First, the magnitude of a vibration of the bearings of the rotor 1 is measured by means of a vibrometer at a rated current load, the vertical component of which is 52 $\mu$m, and transverse component is 70 $\mu$m (FIG. 2). This vibration magnitude is higher than those admissible by the standard and is caused by heat unbalance of the rotor resulted from nonuniform heating and cooling of the active area of the rotor (FIG. 3).

Figure 1:
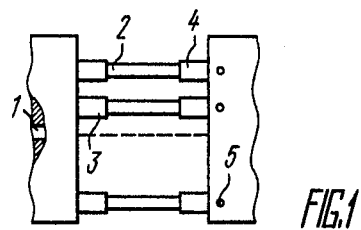
FIG. 1 diagramatically shows coupling the parallel hydraulic branches to the discharge and supply manifolds of the rotor.
Figures 3, 4:
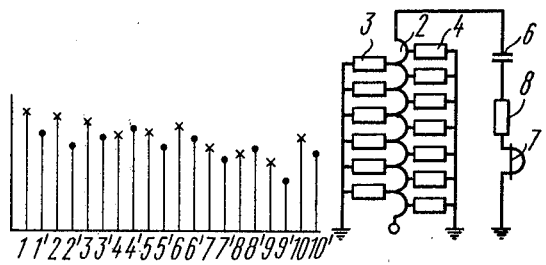
FIG. 3 shows distribution of the temperature of the liquid discharging from parallel hydraulic branches in the case of the heat unbalance of a double polar rotor.
FIG. 4 is a basic circuit of monitoring the variables of cooling conditions when marks are introduced and the rotor is at rest, according to the invention.

The cooling system of the winding 2 of the rotor 1 comprises ten parallel hydraulic branches integrated in supply and discharge manyfolds by means of insulation elements 3 and 4 (FIGS. 1 and 4).

Each of said ten branches consisted of two branches connected in parallel. Hydraulic resistances in all the branches were slightly different.

In order to eliminate the heat unbalance on a stationary rotor, the hydraulic resistance in each pair of diametrically arranged branches is monitored and adjusted to an equal magnitude by means of altering the variables of water in the branches of the cooling system.

To do this, electrolytic sensors 5 (FIG. 1) are mounted at the outlet of each parallel branch, a potential is applied to the winding 2 of the rotor 1 from a power source 6, an oscillograph with galvanometers 7 is connected for detecting a leakage current from the insulation elements 3,4 and signals from the electrolytic sensors 5. A resistor 8 shown in the circuit (FIG. 4) serves to limit the current passing through the galvanometer 7.

Figure 5:
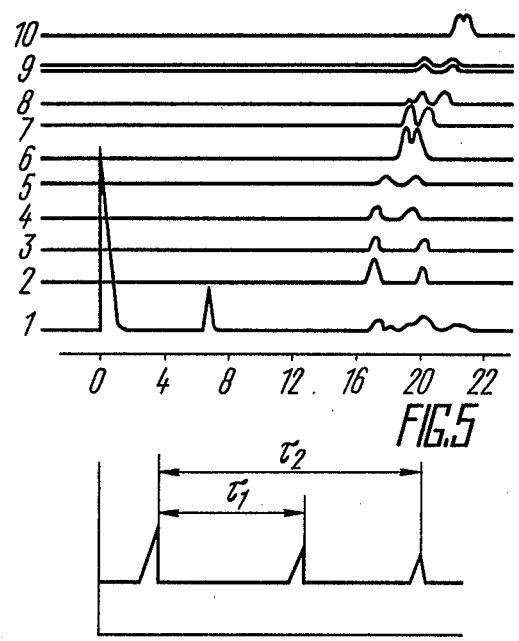
FIG. 5 shows the moments of marks passing through the insulation elements of ten branches prior to changing the hydraulic resistances in all the branches.

The cooling system of the rotor 1 is started when its operating conditions are stabilized, a dose of electrolyte, i.e. a mark, is introduced in the common water flow at the inlet of the rotor 1 (FIG. 1). When the mark passes along the branches of the cooling system, the leakage current grows in the inlet insulation elements 3, and on the oscillogram, there is produced a blip of a pulse whose amplitude is higher than that of the output pulses because the mark passes across all of the inlet insulation elements simultaneously and the leakage current grows greatly. The moments when the mark passes across the insulation elements 4 of the branches at the outlet are taken down by the electrolytic sensors 5 whose signals are also recorded in the oscillogram (FIG. 5). Time intervals in the oscillogram between the pulses correspond to the time at which the mark passes a certain branch.

The difference in the values of intervals between the pulses (FIG. 6) shows the difference in the hydraulic resistance in the branches. A higher interval corresponds to a higher hydraulic resistance, lower flow rate, higher overheating of the liquid and higher degree of heating of the branch.

Figure 6:
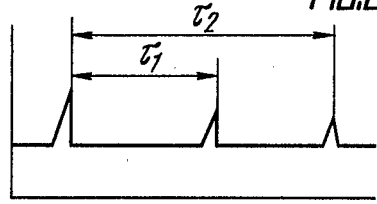
FIG. 6 shows the moments of marks passing through the insulation elements of two parallel branches with different hydraulic resistances.
Figure 7:
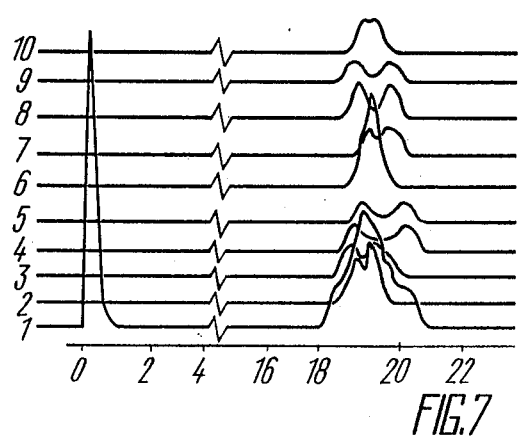
FIG. 7 is the same as in FIG. 5 after changing the hydraulic resistances of the branches, according to the invention.
Figure 8:
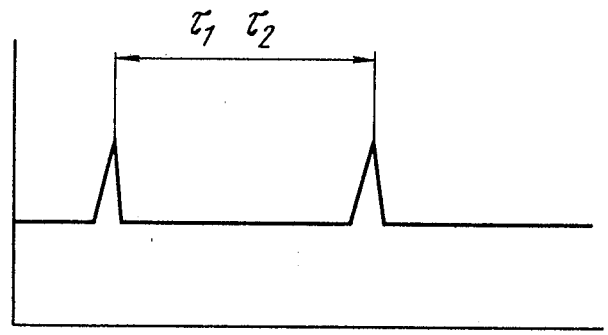
FIG. 8 is the same as in FIG. 6 with equal hydraulic resistances, according to the invention.

The hydraulic resistance in the parallel branches is adjusted by selection of throttles and mounting them at the outlet of the branches. The selection is continued untill all the output pulses in the oscillogram will aligned (FIG. 7). Each stage of the selection of throttles is followed by reading an oscillogram (FIG. 6 and 8).

Figure 9:
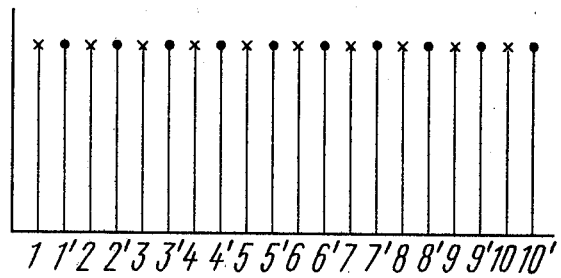
FIG. 9 shows distribution of the temperature of the liquid discharging from all parallel branches, according to the invention, with equal liquid overheating in all the branches.

The alignment of the pulses in an oscillogram shows that overheating of water in all the parallel branch is the same (FIG. 9). The temperature field of the active area of the rotor is uniform, and the heat unbalance is eliminated.

The results of measuring the vibration showed that the vertical component of the vibration lowered to 8 $\mu$m, and the transverse component lowered to 11 $\mu$m (FIG. 2).

Figure 10:
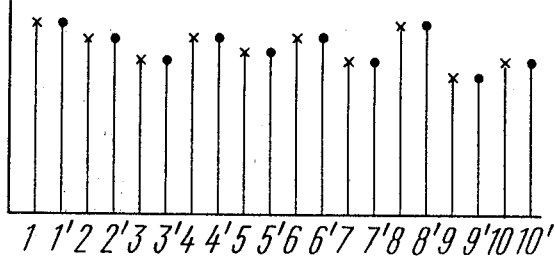
FIG. 10 shows, according to the invention, distribution of the temperature of the liquid discharging from the diametrically arranged branches with equal overheating of said branches.

A heat unbalance of the rotor may be also eliminated by equalizing the hydraulic resistance at least of each pair of diametrically arranged branches. This results in a symmetrical but less uniform field (FIG. 10).

Figure 11:
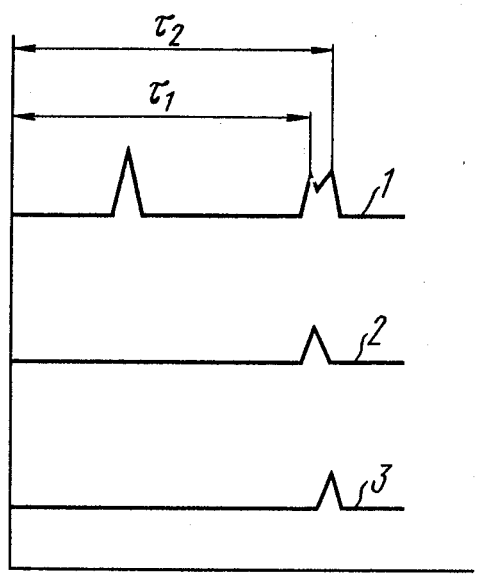
FIG. 11 shows the moments of passing of marks through the insulation elements of two parallel branches and the moments of marks passing through the insulation elements of each of said branches.
Figure 12:
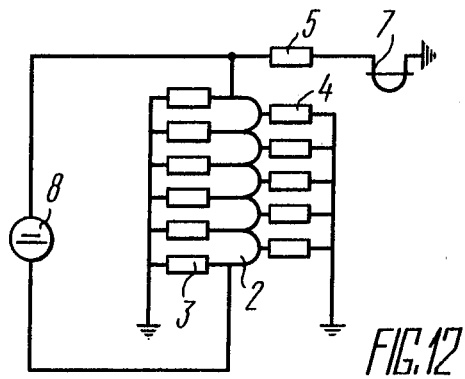
FIG. 12 is the same as in FIG. 4 during the operation of the electrical machines.

Obtaining a general chart of indexes of cooling conditions (FIG. 7, Chart 1), and charts for each branch (FIG. 7, Charts 2 through 10) permits a comparative analysis for identification of the mark in each branch in the general chart (FIG. 11). Thus facilitating diagnostics of the variables of the cooling conditions during the operation of the rotor 1. The circuit for monitoring. The variables of the cooling conditions of the rotor during its operation is shown in FIG. 12.

What is claimed is:

1. A method of balancing a rotor of an electrical machine comprising the following subsequent steps;

starting the liquid cooling system of the rotor winding formed of parallel hydraulic branches on the body of the rotor;

monitoring the variables of cooling conditions in said branches, with the liquid cooling system under operation, for determining temperature asymmetry in the rotor resulting in heat unbalance of the rotor; and altering hydraulic resistance in said branches so that the proportion of said variables provide the same magnitude of overheating of the liquid at least in each pair of the diametrically arranged branches of the cooling system.

2. A method as claimed in claim 1 wherein altering the hydraulic resistance of said branches is carried out so that the proportion of said variables provide the same magnitude of overheating of the liquid in all said branches of the cooling system.

3. A method as claimed in claim 1 wherein monitoring the variables of said branches is carried out by introducing marks in the liquid flow at the inlet of the rotor and by monitoring passing thereof across insulation elements.

4. A method as claimed in claim 1 wherein identification of said marks is carried out by means of readings on sensitive elements mounted at the outlet of said branches downstream the insulation elements.

* * * * *